United States Patent [19]
Elenbaas et al.

[11] Patent Number: 6,119,123
[45] Date of Patent: *Sep. 12, 2000

[54] APPARATUS AND METHOD FOR OPTIMIZING KEYFRAME AND BLOB RETRIEVAL AND STORAGE

[75] Inventors: Jan Hermanus Elenbaas, New York City; Nevenka Dimitrova, Yorktown Heights, both of N.Y.

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,972

[22] Filed: Dec. 2, 1997

[51] Int. Cl.⁷ ....................................................... G06F 9/00
[52] U.S. Cl. ............................................ 707/102; 707/104
[58] Field of Search ........................................... 707/1–225

[56] References Cited

U.S. PATENT DOCUMENTS

| | | | |
|---|---|---|---|
| 5,093,717 | 3/1992 | Sandrew | 348/34 |
| 5,261,041 | 11/1993 | Susman | 345/473 |
| 5,532,833 | 7/1996 | Hong et al. | 358/335 |
| 5,627,936 | 5/1997 | Prasad et al. | 386/96 |
| 5,675,511 | 10/1997 | Prasad et al. | 345/302 |
| 5,692,117 | 11/1997 | Berend et al. | 345/475 |
| 5,765,164 | 6/1998 | Prasad et al. | 707/104 |

*Primary Examiner*—Thomas G. Black
*Assistant Examiner*—John G. Mills
*Attorney, Agent, or Firm*—Leroy Eason

[57] ABSTRACT

A method and apparatus for forming a visual index of scenes in a video image which has been or is being recorded in a computer readable memory. A selected number of keyframes are derived from the recorded image, each being representative of a respective scene therein. The keyframes are then ordered into a selected number of levels of detail of the scenes represented thereby, each level including a predetermined number of keyframes, each subsequent level including keyframes of greater detail than those in a preceding level. A header file is then formed which is descriptive of the ordered set of keyframes, and the header file is stored together with the ordered set of keyframes in the computer readable memory. A user can thereby identify and obtain optimized retrieval in accordance with his preferences of particular segments of the video image from a relatively slow memory device. The method and apparatus are equally applicable to formation of an indexed order of binary large objects ("blobs") in a set of multimedia documents in accordance with a user's preferences.

9 Claims, 7 Drawing Sheets

DESCRIPTION = PAUL'S BIRTHDAY
RECORDED DATE = 1/3/96
INDEX CREATED = 1/4/96
VERSION = 1.0
NODE = 0001
LIST = f0000000.jpg|f0010928.jpg|f0019830.jpg|f0025663.jpg|f0033606.jpg|f0042474.jpg
ANNOTATION =
NODE = 0011
LIST = f0003628.jpg|f0004461.jpg|f0007009.jpg|f0008036.jpg|f0009586.jpg
ANNOTATION =
NODE = 0012
LIST = f0012266.jpg|f0013543.jpg|f0015570.jpg|f0017307.jpg|f0018907.jpg
ANNOTATION =
NODE = 0013
LIST = f0020580.jpg|f0022215.jpg|f0023207.jpg|f0023695.jpg|f0024006.jpg
ANNOTATION =
NODE = 0015
LIST = f0034906.jpg|f0036494.jpg|f0039387.jpg|f0040506.jpg|f0041608.jpg
ANNOTATION =
NODE = 0016
LIST = f0043543.jpg|f0044384.jpg|f0045894.jpg|f0047984.jpg|f0049012.jpg
ANNOTATION =
NODE = 0111
LIST = f0001386.jpg|f0002000.jpg|f0002752.jpg|f0003496.jpg|f0003497.jpg
ANNOTATION =
NODE = 0112
LIST = f0003753.jpg|f0003918.jpg|f0003923.jpg|f0004185.jpg|f0004355.jpg
ANNOTATION =
...
.....
NODE = 0165
LIST = f0048121.jpg|f0048296.jpg|f0048357.jpg|f0048432.jpg|f0048698.jpg
ANNOTATION =
NODE = 0166
LIST = f0049178.jpg|f0049264.jpg|f0049434.jpg|f0049555.jpg|f0050015.jpg
ANNOTATION =

FIG. 3

| HEADER FILE | KEYFRAME IMAGES NODE | KEYFRAME IMAGES NODE |
|---|---|---|

FIG. 5

| HEADER FILE | KEYFRAME 1 | KEYFRAME 11 | KEYFRAME 12 | KEYFRAME 13 | ... | KEYFRAME 16 | KEYFRAME 111 | KEYFRAME 112 | ... | KEYFRAME 116 |
|---|---|---|---|---|---|---|---|---|---|---|

FIG. 6A

| HEADER FILE | KEYFRAME 1 | KEYFRAME 11 | KEYFRAME 111 | KEYFRAME 112 | ... | KEYFRAME 116 | KEYFRAME 12 | KEYFRAME 121 | ... | KEYFRAME 166 |
|---|---|---|---|---|---|---|---|---|---|---|

FIG. 6B

| HEADER FILE | KEYFRAMES LEVEL A | KEYFRAMES LEVEL B | KEYFRAMES LEVEL C |
|---|---|---|---|

FIG. 6C

| HEADER FILE | KEYFRAME 1 | KEYFRAME 2 | KEYFRAME 3 | ... | KEYFRAME 6 | KEYFRAME 12 | KEYFRAME 13 | KEYFRAME 14 | ... | KEYFRAME 66 | KEYFRAME 112 | ... | KEYFRAME 666 | ... |
|---|---|---|---|---|---|---|---|---|---|---|---|---|---|---|

FIG. 6D

| DOCUMENT | TEXT 1 | VIDEO 1 | TEXT 2 | LINK TO DOC 2 | TEXT 3 | VIDEO 2 | AUDIO 1 | LINK TO DOC 3 | TEXT 21 | VIDEO 21 |
|---|---|---|---|---|---|---|---|---|---|---|

APPARATUS AND METHOD FOR OPTIMIZING KEYFRAME AND BLOB RETRIEVAL AND STORAGE

BACKGROUND OF THE INVENTION

1. Field of the Invention

The present invention relates to an apparatus and method for storing in a computer readable medium keyframes of a video image or excerpts from a document, and more particularly to providing for storage thereof so as to optimize retrieval from a relatively slow memory device.

2. Description of the Related Art

In a video indexing process, keyframes that visually describe a video image may be extracted from the video by cut detection and keyframe filtering such as described in pending patent applications "Significant Scene Detection and Frame Filtering for a Visual Indexing System", U.S. Ser. No. 08/867,140 pending and "Video Indexing System", U.S. Ser. No. 08/867,145 pending, having amongst their inventors the inventors of the present invention, to create an index. In video cut detection and keyframe filtering, keyframes are selected from a large number of possible frames (30 frames per second of video, typically). Even after the keyframe filtering process, the number of keyframes is considerable, approximately 250 keyframes per video tape. Typically then, the size of an index is approximately 1 MB, if the keyframes are scaled down to 160×120 resolution and compressed into JPEG format. Without scaling and compression, the size of the index could be 50 MB or more. At this size, retrieval of keyframes could take considerable amount of time, especially if the retrieval is performed over slow channels such as high latency networks (e.g., Internet, Intranet, etc.) or linear tape mediums such as VHS tape.

Similarly, for web sites, web pages or multimedia or hypermedia documents including blobs are presented. A multimedia document or web page containing video (or images) can require a large amount of memory which may be on the order of tens of megabytes. Time required to download such a multimedia document or software may be considerable with a typical 28.8 kb/sec modem.

A website may include a large number of possible web pages, multimedia documents and links which may be unwieldy for a user to navigate. Each multimedia document or web page may include blobs. The blobs may include audio, video, text, hypertext links or links to other documents. A website retrieval of pages or multimedia documents and their respective blobs, especially those a user has an interest in, may take a considerable amount of time as blobs typically are stored in temporal or static hierarchies. A multimedia document may be created which provides a user with web pages having audio, video, text and links based on user preferences or other prespecified criteria.

To optimize retrieval of the keyframes or blobs in a user friendly manner, an index or multimedia document is created using a hierarchical structure representation. Temporal hierarchies have been described in the literature, such as Ueda, Hirotada and Takafumi Miyatake. "Automatic Scene Separation and Tree Structure GUI for Video Editing", The Fourth ACM International Multimedia Conference, Multimedia (Nov. 18–22, 1996): 405–406, as a conceptual representation of keyframes. The present invention creates a linear index structure or linear multimedia document structure out of the temporal hierarchy, allowing for optimized retrieval. Currently, storage in databases is typically not optimized for retrieval, but instead, optimized for transaction processing. For example, database systems are optimized for transaction processing such as editing data (i.e., inserting, updating and deleting data) in a database of the system. Query optimization is available also; however, benchmarks of database systems concentrate on changing data as fast as possible with parallel requests.

In databases, order of retrieval is not known in advance since database management systems typically have no knowledge of stored data content or what query will be requested.

In a Digital Compact Cassette (DCC) format, an index system describes which tracks are on a specific tape; however, priority between different tracks does not exist; therefore, optimization of retrieval of the content is not possible.

For a Web page or another similar type multimedia document, information is provided to a user based on a format prespecified by the provider, not on a user-stored preference.

SUMMARY OF THE INVENTION

An object of the invention is to provide a system which optimizes access to an index of multimedia documents. For that purpose, the invention groups keyframes in nodes in blobs and structures and stores them in a hierarchical manner. The hierarchy includes nodes which are parent or child nodes and blobs based on prespecified user preferences. The number of keyframes (images) in a node and the number of child nodes under a parent node are arbitrary.

DESCRIPTION OF PREFERRED EMBODIMENTS

Figure 1:
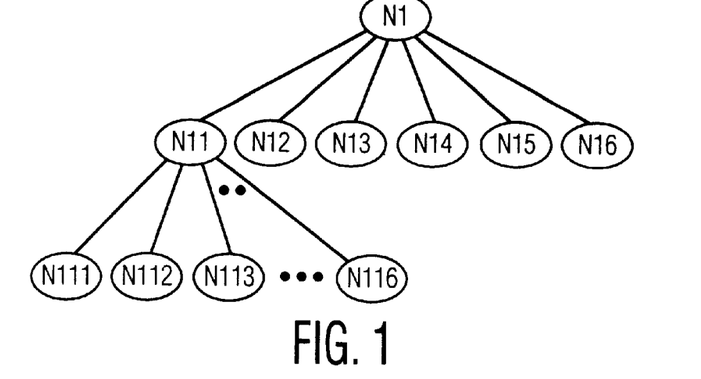
FIG. 1 illustrates a sample visual index hierarchy.

The present invention includes nodes of keyframes or blobs and links in a hierarchy as illustrated in FIG. 1. Although keyframes are referred to in the description, the description is also applicable to blobs.

Figure 2A:
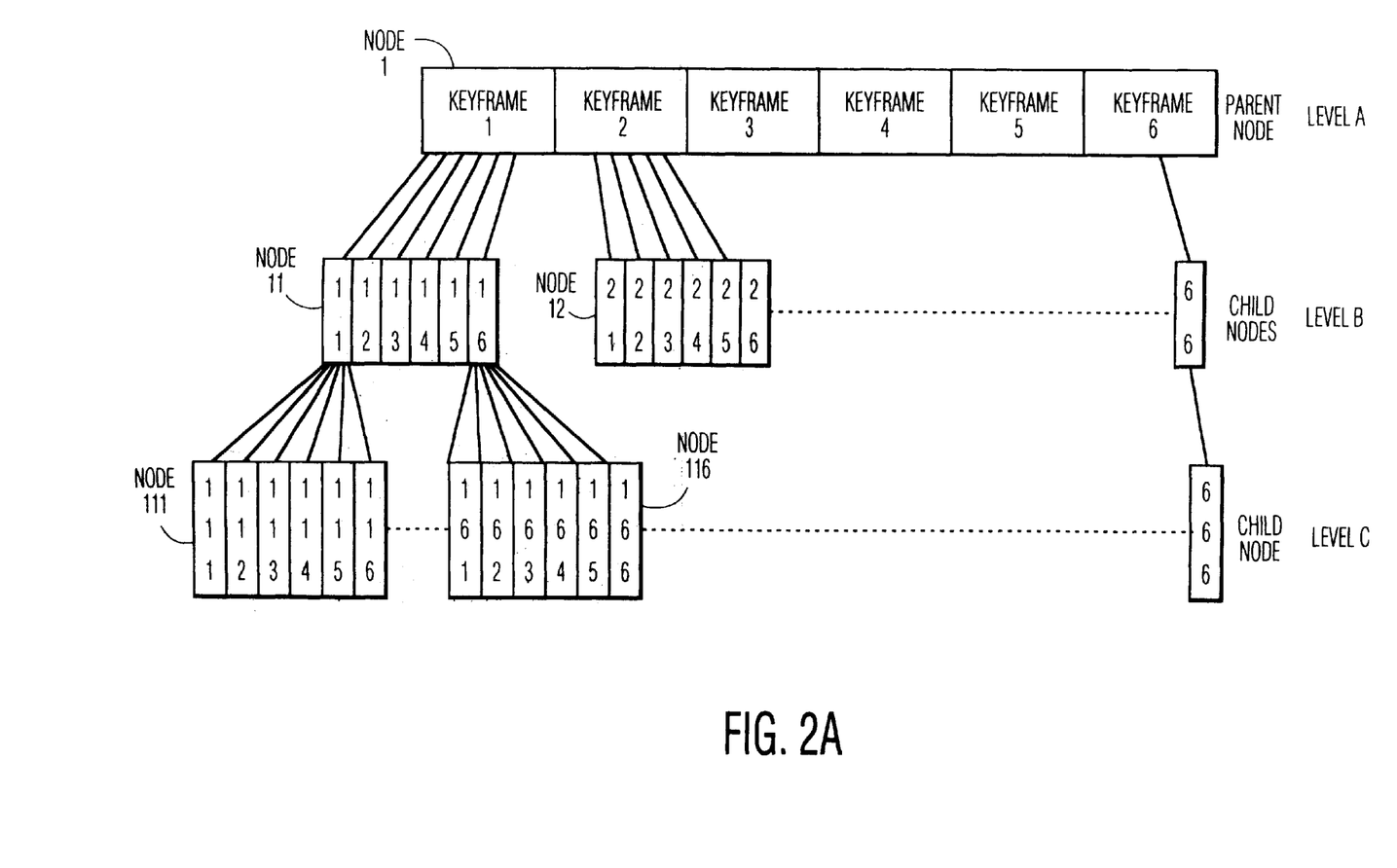
FIGS. 2A–2B illustrates a visual hierarchy for the present invention.

In the present invention, as shown in FIG. 2A, six parent keyframes are in a parent node and a maximum of thirty-six child nodes (six child keyframes per parent keyframe) are under a parent node. Clearly, one skilled in the art could modify the number of nodes or number of child nodes under a parent node.

For reference, the top level of nodes (in this example, one node having six keyframes) is Level A, with keyframes labeled 1, 2 . . . x. The second level of nodes is Level B, and includes six nodes. The keyframes are labeled 11, 12, 13 . . . 16, 21, 22, 23 . . . 26, 31, 32, 33 . . . 36 . . . ; and the keyframes on the third level, Level C, are labeled 111, 112 . . . 116, 121, 122 . . . 126 . . . The keyframes are numbered, for easy reference and illustration only, to indicate their level and order in the level. The various levels of the hierarchy correspond to the level of detail shown with respect to the underlying video, in this example, with decreasing representation of the video as a whole. For example, those keyframes on Level A are the six most representative frames of the video while those keyframes on Level B are the next most representative and on Level C, the next representative.

An example of the hierarchy presented in FIG. 2A is for a video which is six hours long and partitioned into x time parts. In this example, the top nodes on Level A (only one node is shown), each have six parent keyframes that together represent the entire video and each parent keyframe has six child keyframes. Each of the six parent keyframes may correspond to one hour of the entire video, thus partitioning the video in equal blocks of hours, or may correspond to periods of time based on video program structure.

The keyframes on Level B provide more details about the portion of the video tape represented by the parent keyframe. Specifically, keyframes 11, 12, 13 . . . 16 under keyframe 1 provide more detail about the first block of time which keyframe 1 represents. Every keyframe represents a portion of video. For this example, six keyframes are selected to represent the entire video as parent keyframes (Level A), thirty-six keyframes are selected to represent the entire video as child keyframes (Level B) and two hundred and sixteen keyframes are selected to represent the entire video as grandchild keyframes (Level C). Each next level of nodes contains keyframes which are representative of each portion of video of the relevant parent node.

For example, node 1 has all the details of the first portion of the video as represented by six parent keyframes (1–6). On the next level, keyframe 1, for example, is further detailed by six child keyframes 11–16. On the next level, keyframe 11, for example, is further detailed by six grandchild keyframes 111–116.

The hierarchy created does not necessarily represent a balanced tree. Additionally, the keyframe 1 may be the same as keyframe 11 and keyframe 111.

The temporal hierarchy can be stored on a memory device such as a disk or tape using many different structures. In the present invention, the hierarchy is "flattened" for storage in a computer-readable medium by describing the structure in a header file and by grouping the keyframes in independent nodes. For a file, in this example, the filenames of the keyframes represent associated time information in respective intervals of one thirtieth of a second.

Additional more descriptive information from an associated visual index may also be included in the header file, as is done in the present invention. Information in this file is presented in attribute-value pairs at three levels: tape, node and frame. The attribute-value pairs of the present structure gives freedom for inserting new attributes, for example, levels for classification of the tapes or objects within a frame.

Figure 2B:
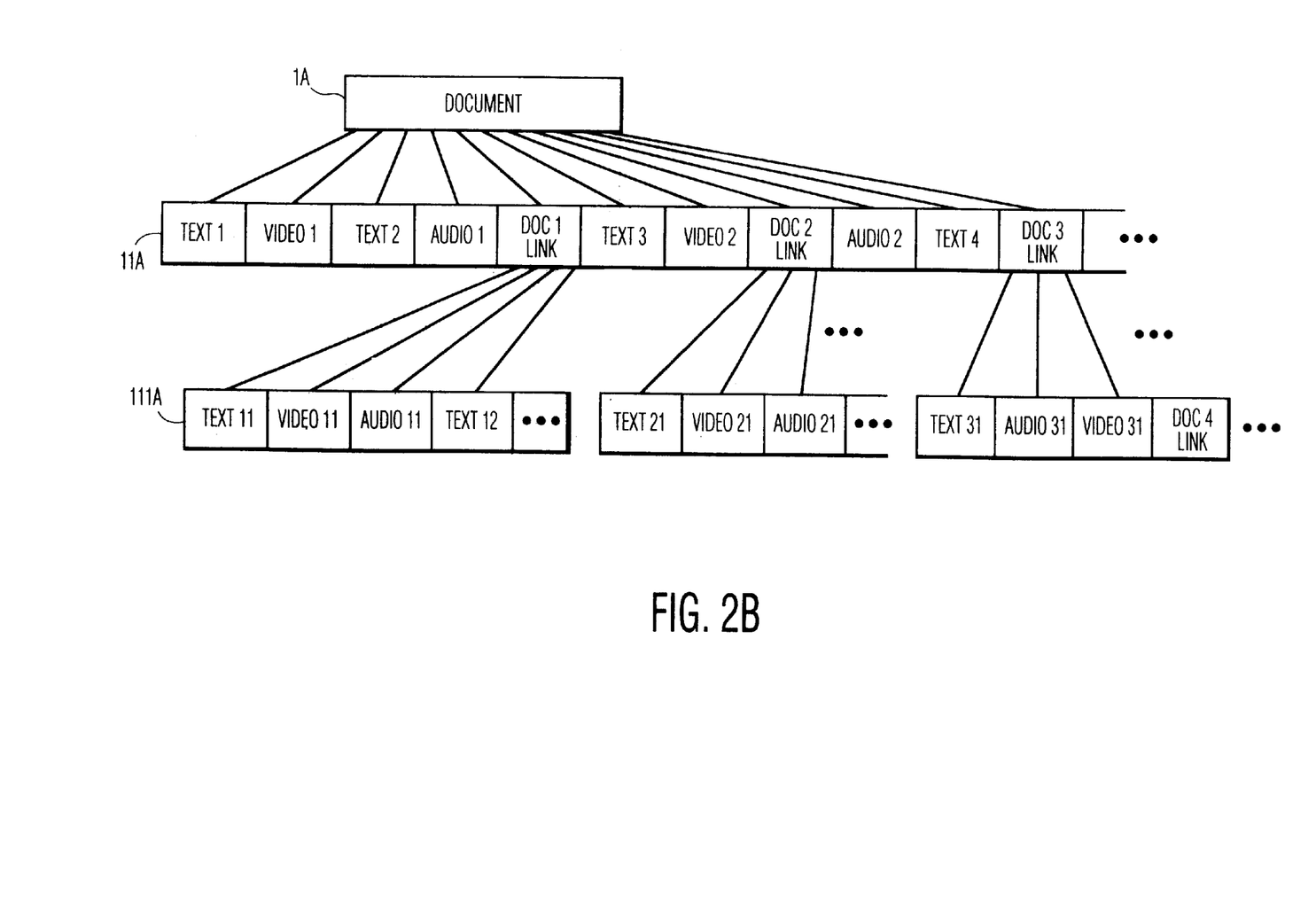

Similarly, the present invention may be used for providing and/or retrieving multimedia documents or hypermedia documents such as a web page. A user may have specific interests, allowing a user profile or user preference information to be created by a server who may then package information dynamically. For example, as shown in FIG. 2B, a document (Document) 1A may contain audio, video (images), text and/or links to further documents (Doc1, Doc2, Doc3, etc.) 11A. A user may only have interest in information contained in some of the audio, video, text or further documents for example, Doc2 and Doc3, but not others such as, Doc1. Each further document, Doc1–Doc3, may include text, audio, and/or video and further links to still further multimedia documents 111A.

The hierarchy created does not necessarily represent how a user would wish to retrieve the information (audio, video, text, and/or links) or have any relation to a user's preference. An analysis can be performed on the information based on a prespecified user profile and the information can be reordered into a temporal hierarchy by "flattening" the reordered hierarchy into a user file which is embodied on a computer-readable medium.

Figure 3:
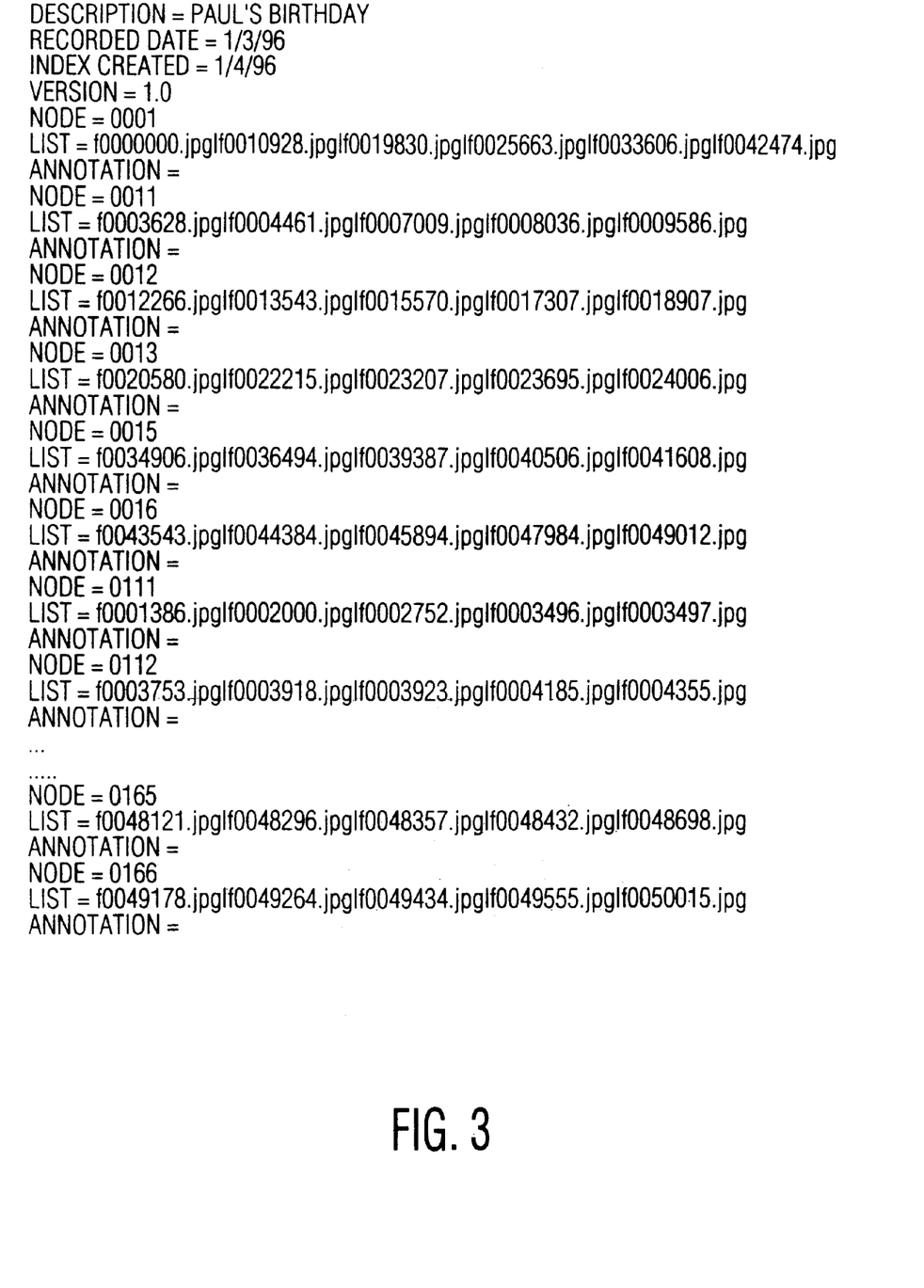
FIG. 3 illustrates a sample header file.

FIG. 3 illustrates a sample header file. A header may include such information as video tape ID, title of the video, category of the video, recording date, index date, tape length, version of the visual index, resolution of the images, number of levels, number of child nodes, and number of key frames in the visual index. This information codes frame numbers and information and based on the coded frame numbers and information, can calculate from which position on the storage, i.e., video tape, CD, a VCR should be positioned. It may be desired to limit the information stored in the header file to prevent data corruption and to reduce storage. Additionally, the header file could be stored in several places on the storage medium to prevent data corruption.

In this example (FIGS. 4A and 4B), a visual index contains a header file (video header) 410 or 416 and the keyframes or keyframe images 412 & 414 or 418 and 420. The visual index of, in this example, 216 keyframe images has a header file of 4 KB while the keyframe images take 844 KB. Although in the present example, one header file is used which may be specific or general to the video, level or group headers (422 and 424 or 426 and 428) could be added to describe specific levels of nodes as shown in FIGS. 4A and 4B, as could other types of headers.

Figure 4A:
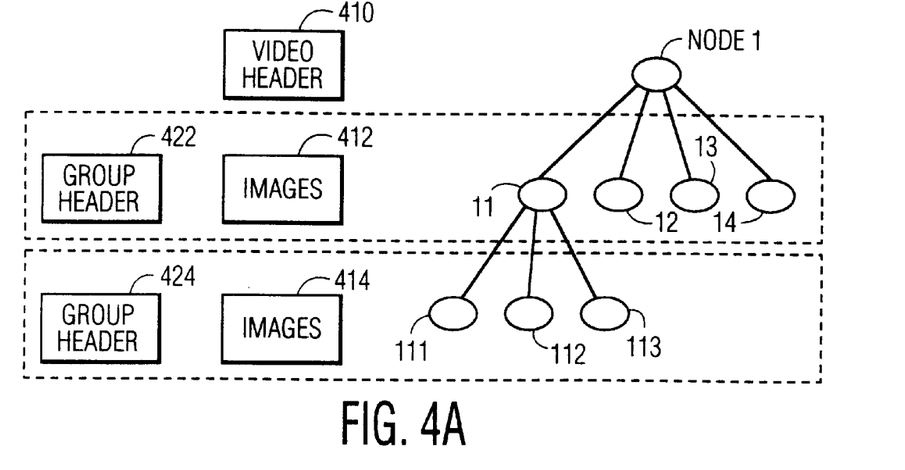
FIGS. 4A–4B illustrate hierarchies with group headers.
Figure 4B:
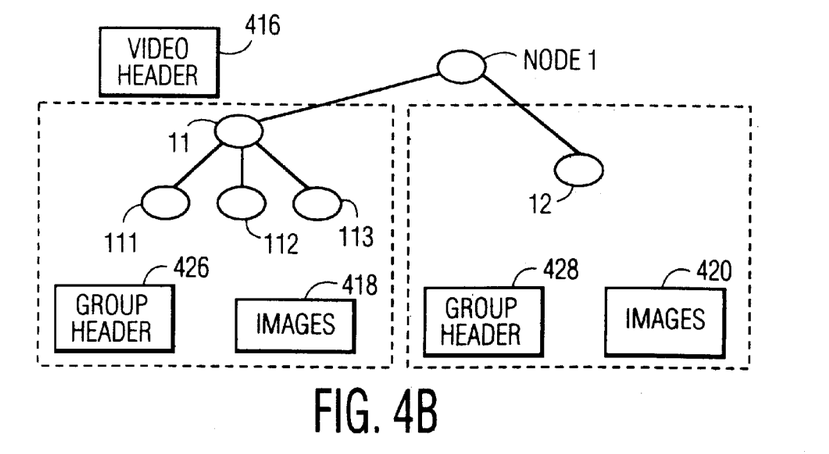

FIG. 4A illustrates a hierarchical level wise keyframe clustering while FIG. 4B illustrates a parent-child wise clustering of keyframes for storage.

Figure 5:
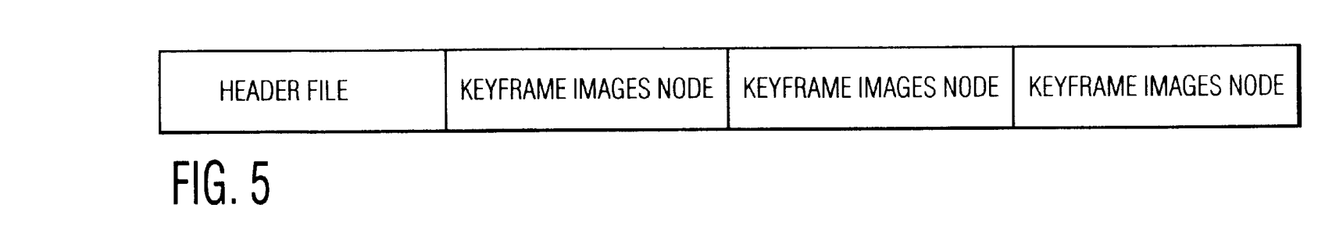
FIG. 5 illustrates a linear representation of the hierarchy.

FIG. 5 illustrates a visual index structure which flattens and linearly represents the hierarchy. In an archiving process, this structure is created on a temporary device such as a disk or other computer-readable medium and written in its entirety to a linear medium, such as a tape or over a network. In the present invention, the header file is the first file to allow easy access to information saved in the visual index. Ordering of keyframe image node files is done depending on the rendering of the hierarchical temporal structure.

Figure 6A:
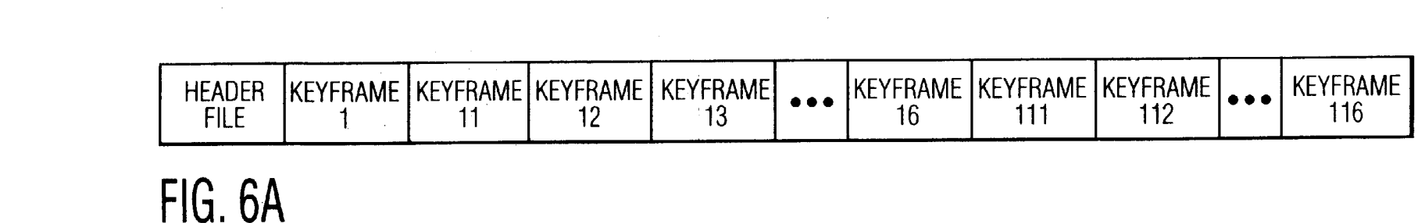
FIGS. 6A–6E illustrate detailed representations of the hierarchy.
Figure 6B:
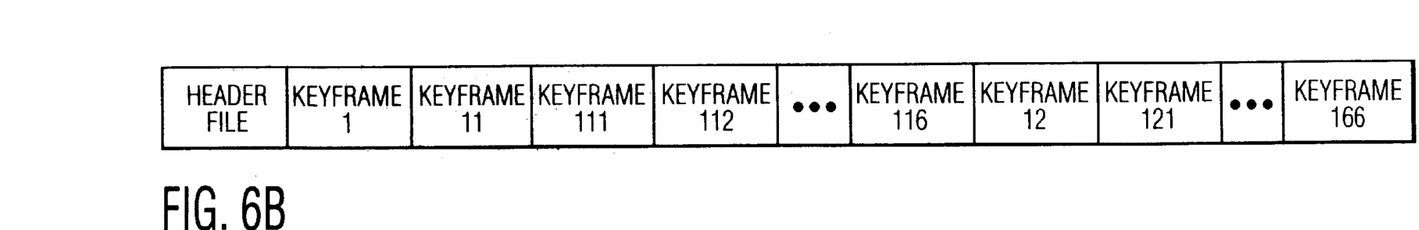
Figure 6C:
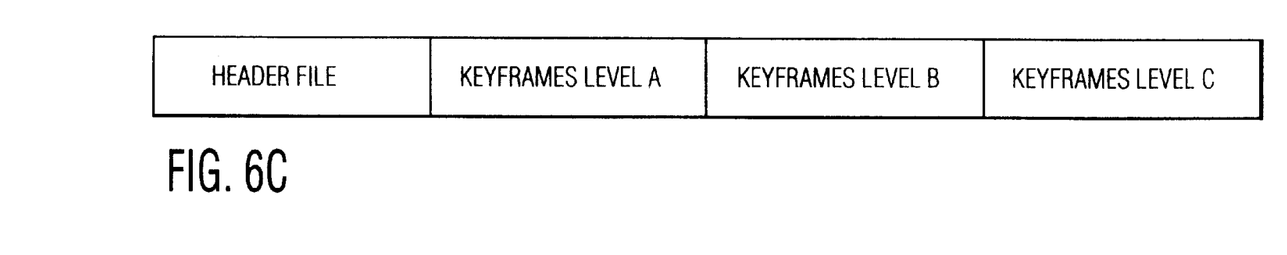
Figure 6D:
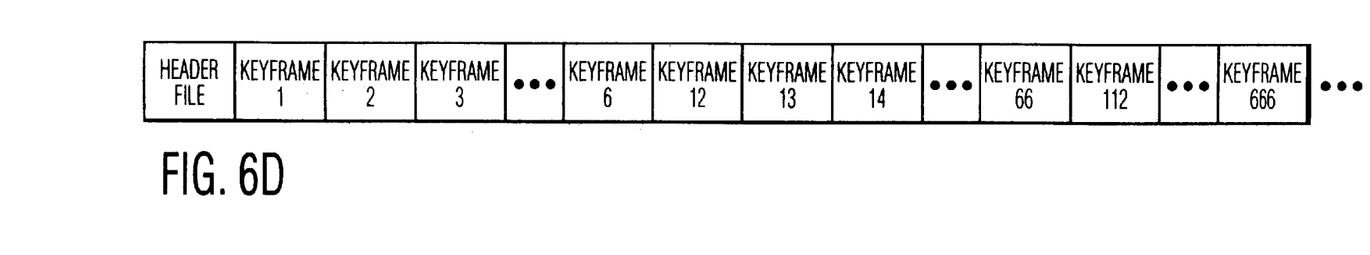

Depending on the user interface, the nodes of keyframes are ordered in a selected structure and saved. Several different ordering structures are possible, as shown in FIGS. 6A–E. Specifically, FIG. 6A illustrates a hierarchical top-down ordering, FIG. 6B illustrates a left-right ordering and FIG. 6C illustrates a level ordering. FIG. 6D illustrates a level ordering which eliminates redundant storing of same frames. Specifically, as previously mentioned, keyframe 1, 11, and 111 may represent the same image and thus, storage of all three is redundant. Thus, only keyframe 1, for example, is stored.

Figure 6E:
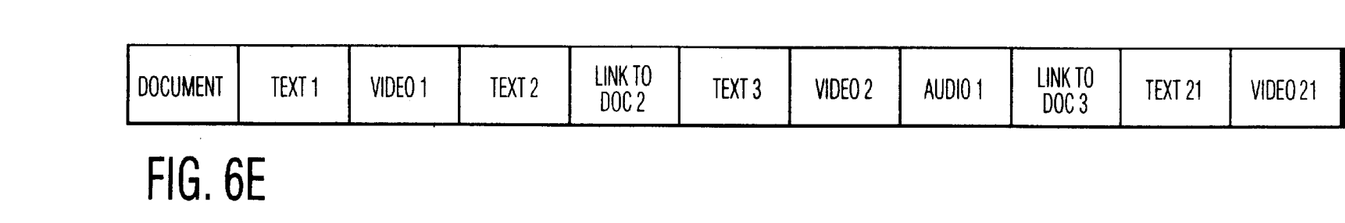

FIG. 6E illustrates an ordering for a multimedia document which eliminates links to other documents, text, audio, or video, in which a user has indicated disinterest, to provide a user file. FIG. 6E provides an example of ordering for the example described in FIG. 2B.

In all orderings, a node header, if used, may include such information as ID, number of key frames for the specific level, and for each key frame, ID, annotation, position, number of child nodes and frame signature.

Node images may also be included. For each keyframe, information such as ID and image data may be included.

To retrieve the saved keyframes, the header file is read first, then the Level A first keyframes or blobs are read and stored on a temporary device such as a disk or other computer-readable medium. To optimize retrieval of the visual index or multimedia document, the visual index or multimedia document is restored in different segments. After each segment is read, the information can be displayed to the user. Thus, a user does not have to wait for the entire visual index or multimedia document to load to look at levels or areas of interest already loaded. A user may see the most representative keyframes or blobs of interest and progress toward more detail as the visual index or web page, respectively is being loaded. At the moment the keyframe image node or blob that for the user interface is read, it is sent to a memory from where the images, etc. may be displayed to the user. Finally, the other keyframe images or blobs are loaded in a prespecified order.

Figure 7A:
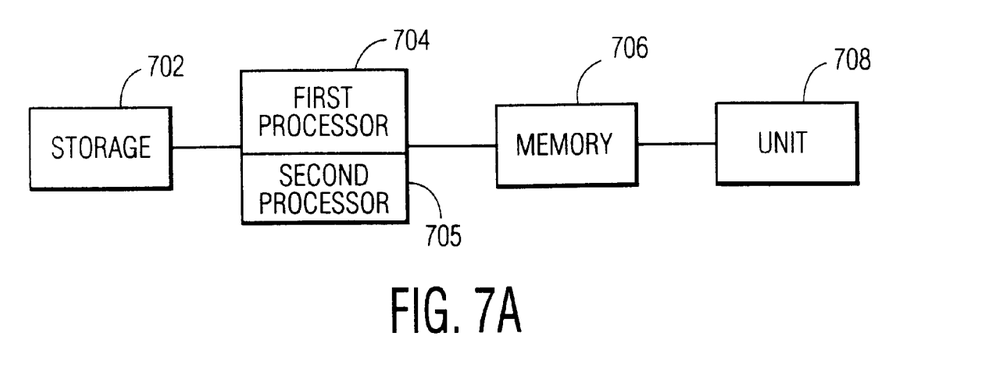
FIGS. 7A–7B are systems of the present invention.
Figure 7B:
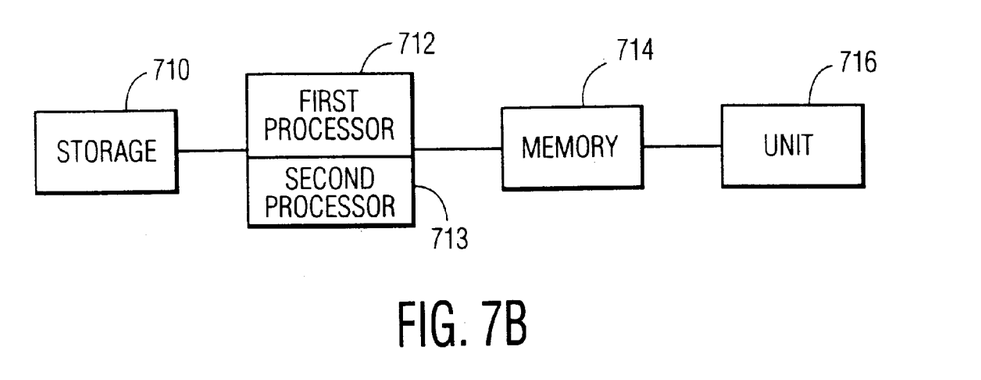

FIGS. 7A and 7B illustrate example systems of the present invention. Specifically, in FIG. 7A, a storage 702 has a selected number of most representative keyframes as provided by a video indexing system or other automatic or manual means. The storage 702 provides the selected keyframes to a first processor 704 which orders the keyframes into a selected number of levels, each level including a predetermined number of the most representative keyframes and each subsequent level including a multiple number of keyframes of the previous level. A second processor 705, which may be a separate second processor 705 or a part of the first processor 704, creates at least one header file based on information about the most representative keyframes of the video.

The header file and keyframes are embodied in an index file in a memory 706 which may be a separate memory or part of the storage 702. A unit 708 which may be a separate device such as a computer, VCR, or television and may have a user-interface, then retrieves the index file and presents the keyframes for each level, as each level is retrieved.

Similarly, the example system in FIG. 7B has a storage 710 which may be, for example, present in a server. A first processor 712 would order blobs into a selected number of levels. Each level would include at least one blob of text, video, audio and links to other multimedia or hypertext documents. Each subsequent level would include at least one blob of text, video, audio and further links for each of the other multimedia or hypertext documents.

A second processor 713, which may be a separate processor or part of the first processor 712, would organize blobs into a user file based on user preference information. The second processor 713 would be able to analyze a blob or link against a database or based on embedded information, to determine if the blob or link falls within a user's prespecified area of interest. The second processor then organizes blobs and links based on this analysis to present those blobs and links at the top of a user's prespecified areas of interest first, such as was shown in FIG. 6E.

A memory 714, which may be a separate storage or part of the storage 710 would store the organized blobs and links embodied in the user file. A unit 716, such as a computer, would retrieve the user file and present the blobs and links, as each is retrieved.

As can now be readily appreciated, the invention allows storage of keyframes or blobs so as to optimize retrieval from a relatively slow memory device. The invention may be included in any of the subsystems or may be a separate subsystem. One skilled in the art may easily use differing numbers of nodes, keyframes, blobs, headers, node headers and node images. Additional modifications may easily be made by one skilled in the art.

The present invention may also be expanded to include video clips, audio (sound, speech, music, etc.), colors or video characteristics, and/or annotation, text or data (manually or automatically added) in conjunction with or presented separately with the keyframes.

Further, a master index could be stored for a collection of video tapes, files, etc. allowing a user to view the master index which may include information as to where specific programs, segments, etc. are stored.

The keyframes could also be analyzed and consequently, reorganized according to prespecified criteria such as user preferences or various clustering methods, such as shown in FIGS. 4A and 4B. This would permit storage such that those keyframes which are indicated as having a higher priority are stored first in the data structure of the index file to permit earlier retrieval.

It will thus be seen that the objects set forth above among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not limiting sense.

It is also to be understood that the following claims are intended to cover all of the generic and specific features of the invention herein described and all statements of the scope of the invention which, as a matter of language, might be said to fall therebetween.

What is claimed is:

1. A method of forming a user index of scenes in a video image which is recorded or being recorded in a computer-readable medium, said method comprising the steps of:

retrieving from the recorded video image a selected number of keyframes therein, each keyframe being a frame representative of a respective scene in said image;

ordering the keyframes in accordance with user preference information into a hierarchy of a selected number of levels of detail in the scenes represented thereby, each level including a predetermined number of keyframes, each subsequent level including keyframes of greater detail than those in a preceding level; and storing the ordered keyframes in said computer-readable medium to thereby form said user index of scenes in said image ordered in accordance with the user preference information, thus reducing the time for accessing the ordered hierarchy for scenes according to the user's preferences.

2. A method of forming a user index as claimed in claim 1, further comprising the steps of:

creating at least one header file which is descriptive of said keyframes; and storing the at least one header file with the ordered keyframes, so that said header file is included in the user index.

3. A system for forming a user index of scenes in a video image which is recorded or being recorded in a computer-readable memory, said system comprising:

means for retrieving from said memory a selected number of keyframes of the video image, each keyframe being a frame representative of a respective scene in said image;

a first processor for ordering the keyframes in a hierarchy in accordance with user preference information into a selected number of levels of detail in the scenes represented thereby, each level including a predetermined number of keyframes, each subsequent level including keyframes of greater detail than those in a preceding level;

a second processor for creating at least one header file which is descriptive of said keyframes, and storing said at least one header file with the ordered keyframes so as to form said user index in said memory; and means for retrieving said user index and displaying the keyframes therein for each level as such level is retrieved from said memory ordered in accordance with the user preference information, thus reducing the time for accessing the user index for scenes according to the user's preferences.

4. A system as claimed in claim 3, wherein said first processor and said second processor are parts of a main processor.

5. A method for forming a user file of binary large objects ("blobs") in a set of multimedia documents recorded in a computer-readable medium, so as to optimize retrieval of blobs in accordance with user preference information; said method comprising the steps of:

creating a preference file based on the user preference information;

retrieving blobs from the multimedia documents and ordering them into a selected number of levels in accordance with said preference file, each level including at least one blob from at least one of said documents and at least one link to another of said documents, each subsequent level including blobs from further multimedia documents; and storing particular blobs and links in said computer-related medium so as to form a user file for retrieval thereof from said set of multimedia documents in accordance with said preference file, thereby reducing the time for accessing the user file for blobs according to the user's preferences.

6. A system for forming a user file of binary large objects ("blobs") in a set of multimedia documents recorded in a computer-readable medium, so as to optimize retrieval of blobs in accordance with user preference information; comprising:

a first processor for retrieving blobs from the multimedia documents and ordering them into a selected number of levels, each level including at least one blob from at least one of said documents and at least one link to another of said documents, each subsequent level including blobs from further multimedia documents;

a second processor for organizing the blobs and links from the first processor into a user file ordered in accordance with the user preference information;

a memory for storing the user file; and means for retrieving blobs and links from the stored user file and displaying them to the user as each is retrieved, whereby the time for the user to access the user file for blobs and links according to the user's preferences is reduced.

7. A system as claimed in claim 6, wherein said first processor and said second processor are part of a main processor.

8. A system as claimed in claim 6, wherein said memory is part of said computer-readable medium.

9. A system as claimed in claim 6, wherein said second processor analyzes each blob and link and determines if the respective blob or link is within an area of preference to the user.

* * * * *